US011602824B2

(12) United States Patent
Li

(10) Patent No.: US 11,602,824 B2
(45) Date of Patent: Mar. 14, 2023

(54) ADJUSTABLE TORQUE CLAMPING FIXTURE

(71) Applicants: HANGZHOU UNITED ELECTRIC MANUFACTURE CO., LTD., Zhejiang (CN); HANGZHOU GREAT STAR INDUSTRIAL CO., LTD., Zhejiang (CN)

(72) Inventor: Yueming Li, Zhejiang (CN)

(73) Assignees: HANGZHOU UNITED ELECTRIC MANUFACTURE CO., LTD., Zhejiang (CN); HANGZHOU GREAT STAR INDUSTRIAL CO., LTD., Zhejiang (CN)

( * ) Notice: Subject to any disclaimer, the term of this patent is extended or adjusted under 35 U.S.C. 154(b) by 26 days.

(21) Appl. No.: 17/295,427

(22) PCT Filed: Dec. 25, 2019

(86) PCT No.: PCT/CN2019/128336

§ 371 (c)(1),
(2) Date: May 19, 2021

(87) PCT Pub. No.: WO2020/135509

PCT Pub. Date: Jul. 2, 2020

(65) Prior Publication Data

US 2021/0402572 A1 Dec. 30, 2021

(30) Foreign Application Priority Data

Dec. 28, 2018 (CN) ......................... 201811619083.7

(51) Int. Cl.
*B23P 19/00* (2006.01)
*B25B 5/10* (2006.01)

(52) U.S. Cl.
CPC .................................... *B25B 5/101* (2013.01)

(58) Field of Classification Search
CPC ........... B25B 5/101; B25B 5/102; B25B 5/10; B25B 5/006; B25B 5/003
See application file for complete search history.

(56) References Cited

U.S. PATENT DOCUMENTS

2014/0103595 A1 4/2014 Yang

FOREIGN PATENT DOCUMENTS

CN 101829972 A 9/2010
CN 203901149 U 10/2014
(Continued)

OTHER PUBLICATIONS

European search report dated Jul. 27, 2022.

*Primary Examiner* — Lee D Wilson
*Assistant Examiner* — Alyssa R Williams
(74) *Attorney, Agent, or Firm* — Gang Yu

(57) ABSTRACT

Some embodiments of the present disclosure provide an adjustable torque clamping fixture, including a clamping body driven by a threaded rod to move and used for clamping an object. The threaded rods implements an axial movement thereof by means of screw thread transmission. An adjustable torque handle is configured at the rear end of the threaded rod. The maximum clamping force is adjusted by the adjustable torque handle. When the maximum clamping force is attained, continued application of a torque on the threaded rod by the handle results in slippage, so that no larger clamping force can be applied, thus implementing precision clamping, and preventing the clamped object from being damaged by an excessive torque. The adjustable torque clamping fixture overcomes the shortcoming of a manual clamping fixture known to inventors of which the magnitude of the clamping force is difficult to determine during use.

10 Claims, 6 Drawing Sheets

(56) References Cited

FOREIGN PATENT DOCUMENTS

| | | | | |
|---|---|---|---|---|
| CN | 105643021 | A | 6/2016 | |
| CN | 206105668 | U | 4/2017 | |
| CN | 209408309 | U | 9/2019 | |
| DE | 1865099 | U1 * | 1/1963 | |
| DE | 202005006080 | U1 * | 10/2005 | ............ B25B 5/101 |
| DE | 102015122699 | A1 | 6/2017 | |
| KR | 101696246 | B1 | 1/2017 | |

* cited by examiner

ADJUSTABLE TORQUE CLAMPING FIXTURE

CROSS-REFERENCE TO RELATED APPLICATIONS

The present disclosure is a national stage application of International Patent Application No. PCT/CN2019/128336, which is filed on Dec. 25, 2019, and claims priority to Chinese Patent Application No.201811619083.7, filed on Dec. 28, 2018 and entitled "Adjustable Torque Clamping Fixture", the contents of which are hereby incorporated by reference in its entirety.

TECHNICAL FIELD

The present disclosure relates to a manual clamping fixture, in particular to an adjustable torque clamping fixture.

BACKGROUND

In addition to the basic function of clamping, a manual clamping fixture known to inventors is often difficult to determine a magnitude of the clamping force during use. A small clamping force cannot achieve reliable clamping, and a larger clamping force may damage a clamped object, which results in a blindness of clamping and makes it difficult to accurately achieve a purpose of clamping.

SUMMARY

Some embodiments of the present disclosure provide an adjustable torque clamping fixture, the technical problem to be solved and the technical task proposed in the present disclosure is to overcome a defect that it is difficult to determine a magnitude of a clamping force when a manual clamping fixture known to inventors is used. The adjustable torque clamping fixture sets a maximum clamping force, so that after the maximum clamping force is attained, a larger clamping force cannot be applied, thereby achieving precision clamping.

To achieve the above object, the adjustable torque clamping fixture of the present disclosure includes a first clamping body driven by a threaded rod and used for clamping an object, an axial movement of the threaded rod being realized by screw thread transmission, wherein a rear end of the threaded rod is provided with an adjustable torque handle, the adjustable torsion handle includes a grab handle with an inner cavity, a first end face teeth, a second end face teeth, an axial support spring and an adjustment mechanism, the first end face teeth are located in the inner cavity, are rotatably sleeved on the threaded rod and fixedly cooperated with the grab handle to transmit a torsion, the second end surface teeth are located in the inner cavity, and slipably engaged with the first end surface teeth, the second end face teeth are axially moved and are sleeved on the threaded rod by transmitting a torsion, the axial support spring is provided between the second end face teeth and the adjustment mechanism and are configured to for apply an spring force to the second end face teeth, the spring force causes the second end face teeth to contact the first end face teeth, the adjustment mechanism includes an adjustment knob, the adjustment knob is rotatably cooperated with the grab handle, and a rotation of the adjustment knob is used for adjusting an spring force of the axial support spring.

As a preferred technical means, wherein the adjustment mechanism includes a threaded sleeve and a threaded nut, the threaded sleeve is rotatably sleeved at the rear end of the threaded rod and is driven by the adjustment knob to rotate, the threaded nut is sleeved on the threaded sleeve and screw thread cooperated with the threaded sleeve, and the threaded nut is fitted with the grab handle for an axial movement, the axial support spring is a helical compression spring sleeved on the threaded rod, and two ends of the helical compression spring are respectively supported on the second end face teeth and the threaded nut.

As a preferred technical means, the adjustment mechanism includes a washer connected to the rear end of the threaded rod, and the washer limits the threaded sleeve to the rear end of the threaded rod.

As a preferred technical means, a window corresponding to the threaded nut is provided on the grab handle, and a reading index is provided on the threaded nut, and a clamping force scale is provided on the grab handle.

As a preferred technical means, a reading index and a clamping force scale are respectively provided on the adjustment knob and the grab handle.

As a preferred technical means, the adjustable torque handle includes a first shaft retainer ring for limiting an axial movement of the threaded rod relative to the grab handle, wherein the first shaft retainer ring is sleeved on the threaded rod.

As a preferred technical means, the adjustable torque handle includes a second shaft retainer ring for limiting an axial movement of the first end face teeth relative to the grab handle, wherein the second shaft retainer ring is sleeved on the threaded rod.

As a preferred technical means, the first end face teeth are rotatably sleeved on the threaded rod by a cylindrical surface, and the first end face teeth are cooperated with the grab handle by a plane, so as to realize a fixed cooperating of the first end face teeth with the grab handle.

As a preferred technical means, the second end face teeth are sleeved on the threaded rod, and achieve an axial movement with the threaded rod, and transmit a torsion by a plane cooperation.

As preferred technical means, the adjustable torque clamping fixture is one of an F-clamp, a G-clamp, an angle clamp, a flat mouth clamp, a cloth strip clamp, a pipe clamp, and a wood clamp.

According to some embodiments of the present disclosure, the first clamping body for clamping the object is moved by the threaded rod, the threaded rod implements an axial movement thereof by means of screw thread transmission, an adjustable torque handle is configured at the rear end of the threaded rod, the maximum clamping force is adjusted by the adjustable torque handle, when the maximum clamping force is attained, continued application of a torque on the threaded rod by the handle results in slippage, so that no larger clamping force can be applied, thus implementing precision clamping, and preventing the clamped object from being damaged by an excessive torque.

ILLUSTRATION OF REFERENCE NUMERALS IN THE DRAWINGS

01, threaded rod, 11, cylindrical surface, 12, plane;
02, first clamping body;
03, adjustable torsion handle;
31, inner cavity;
32, grab handle;
33, first end face tooth, 331, plane;
34, second end face tooth;
35, axial support spring;
36, adjustment mechanism, 361, adjustment knob, 362, threaded sleeve, 363, threaded nut, 364, washer, 365, reading index, 366, screw, 367, plane;
37, window;
38, first shaft retainer ring;
39, second shaft retainer ring;
41, guide rod, 42, first arm, 43, second arm, 44, second clamping body, 45, positioning and locking structure;
51, first arm, 52, second arm, 53, second clamping body;
61, base, 62, second clamping body;
71, guide rod, 72, first arm, 73, second arm, 74, second clamping body, 75, positioning and locking structure;
81, support, 82, second clamping body, 83, groove;
91, support, 92, guide rod, 93, first arm, 94, second arm, 95, second clamping body, 96, first auxiliary clamping body, 97, second auxiliary clamping body;
10, second clamping body.

DETAILED DESCRIPTION OF THE EMBODIMENTS

Some embodiments of the present disclosure will be further described hereinafter in conjunction with accompanying drawings.

Figure 1:
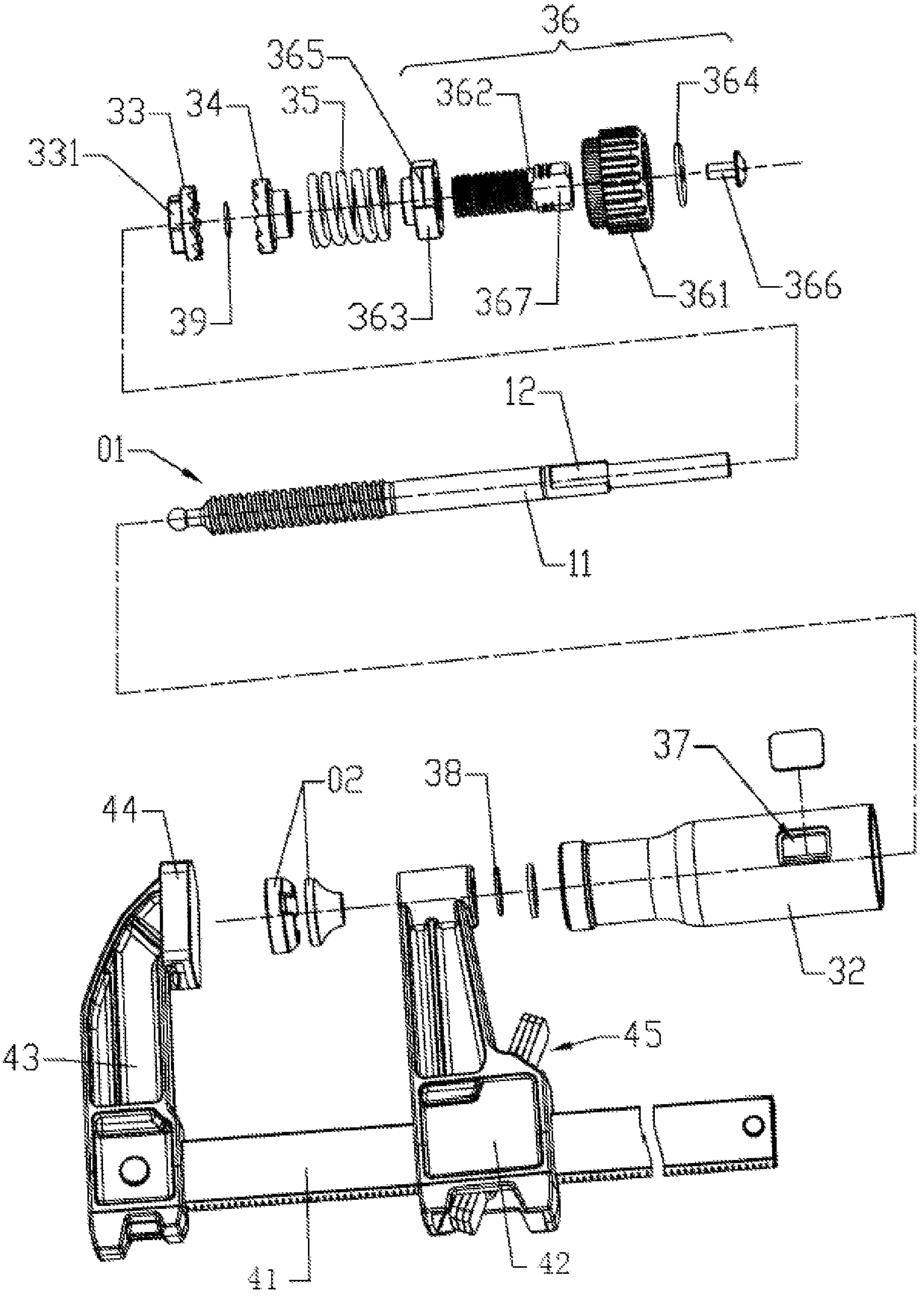
FIG. 1 illustrates a schematic diagram of a disassembled structure of a first adjustable torque clamping fixture according to some embodiments of the present disclosure.
Figure 2:
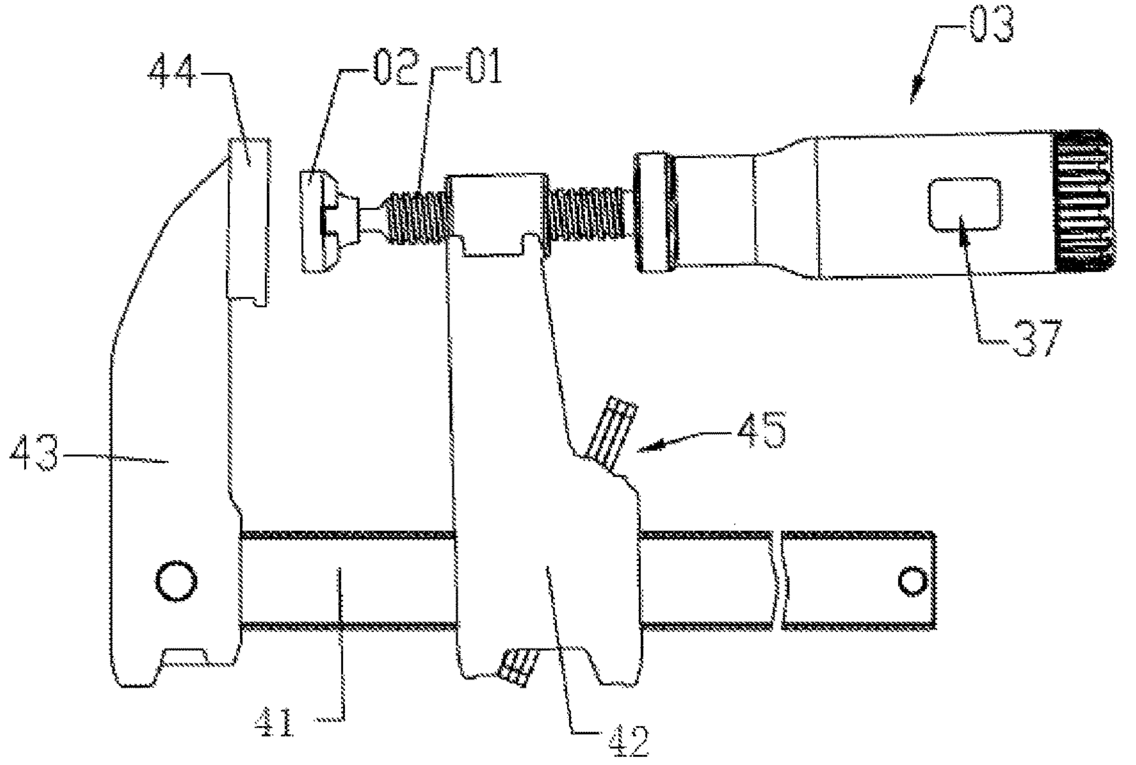
FIG. 2 illustrates a schematic diagram of an assembly state of the first adjustable torque clamping fixture shown in FIG. 1.
Figure 3:
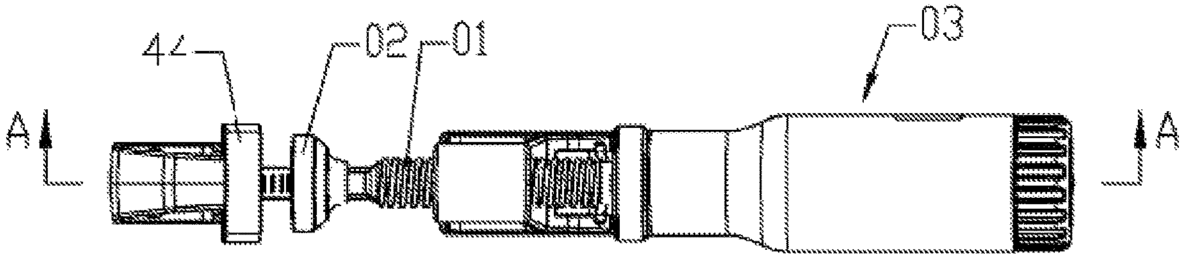
FIG. 3 illustrates a top view of the first adjustable torque clamping fixture in FIG. 2.
Figure 4:
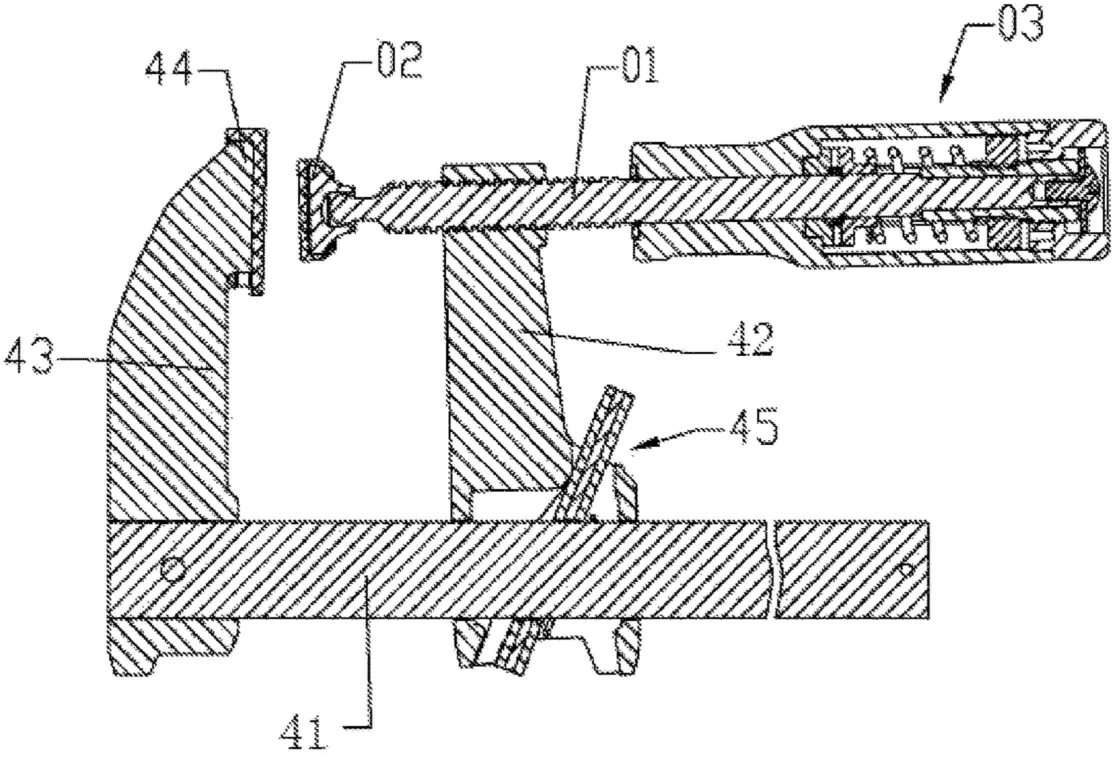
FIG. 4 illustrates a cross-section view of the first adjustable torque clamping fixture in FIG. 3 along A-A.
Figure 5:
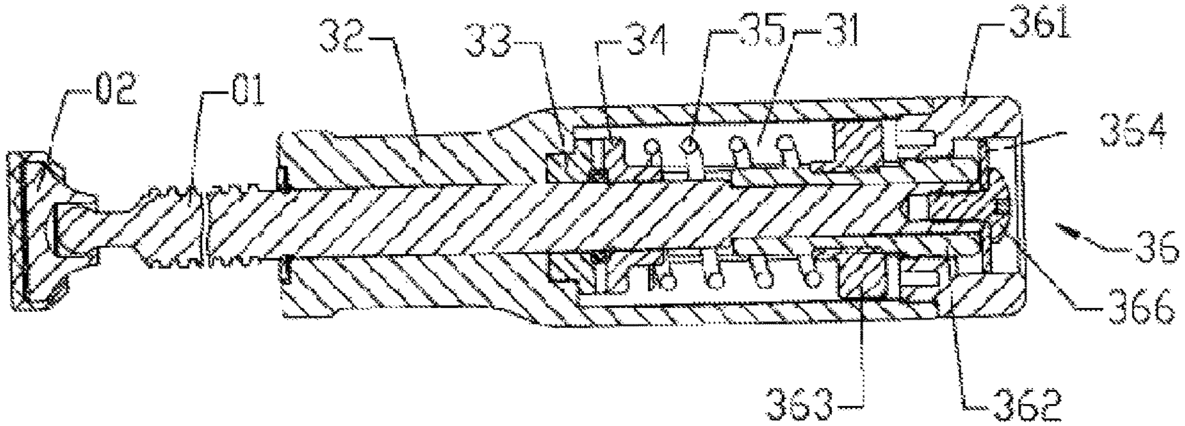
FIG. 5 illustrates an enlarged view of the first adjustable torque clamping fixture in FIG. 4.

The adjustable torque clamping fixtures as shown in FIGS. 1-4, 5, 6, 7, 8, 9, 10 and 11 all include a first clamping body 02 which is driven by a threaded rod 01 to move and is used for clamping an object, the threaded rod 01 achieves an axial movement thereof by means of screw thread transmission, and as shown in the figures, positions for the adjustable torque clamping fixtures of different structural forms to achieve screw thread transmission with the threaded rod are different. An adjustable torsion handle 03 is configured at a rear end of the threaded rod 01, the maximum clamping force is adjusted by means of the adjustable torsion handle, the adjustable torsion handle 03 includes a grab handle 32 with an inner cavity 31, first end surface teeth 33, second end surface teeth 34, an axial support spring 35, and an adjustment mechanism 06. The first end face teeth 33 are located in the inner cavity 31, are rotatably sleeved on the threaded rod 01 and are fixedly configured with the grab handle 32 to transmit a torsion. Specifically, the first end face teeth 33 are rotatably sleeved on the threaded rod 01 by means of a cylindrical surface 11 and cooperated with the grab handle 32 by means of a plane 331 (shown as a hexagonal face), so as to realize the fixed cooperating with the grab handle. The second end face teeth 34 are located in the inner cavity 31 and are slipably engaged with the first end face teeth 33, the second end face teeth 34 are axially moved and are sleeved on the threaded rod 01 for transmitting a torsion. Specifically, the second end face teeth 34 are sleeved on the threaded rod 01, cooperated with the plane 12 to achieve axial movement with the threaded rod, and transmit a torsion. The slipably engaging means that a torsion is transferred when the second end face teeth are engaged with the first end face teeth, and when the torsion reaches a certain degree, the first end face teeth and the second end face teeth slip, so as to avoid applying a larger clamping force to the clamped object. For this, as shown in FIG. 1, opposite end faces of the first end face teeth 33 and the second end face teeth 34 are provided with beveled teeth, accordingly, when the first end face teeth rotate towards to a direction with respect to the second end face teeth, slippage can be achieved, and thus it is suitable to clamp an object in this case; on the contrary, when the first end face teeth rotate towards to another direction with respect to the second end face teeth, no slippage occurs, and thus it is suitable to release a clamped object in this case. The axial support spring 5 is provided between the second end surface teeth 34 and the adjustment mechanism 36 for applying an spring force to the second end surface teeth, the spring force causes the second end surface teeth to contact the first end surface teeth, and the magnitude of the spring force determines the maximum torque applied to the threaded rod by the grab handle. The adjustment mechanism 36 comprises an adjustment knob 361. The adjustment knob 361 is rotatably cooperated with the grab handle 32, and rotation of the adjustment knob is used for adjusting the spring force of an axial support spring; therefore, by rotating the adjustment knob, the maximum torsion applied to the threaded rod by the grab handle can be adjusted. The adjustment knob 361 is rotatably cooperated with the grab handle 32, and an annular rib and an annular groove are respectively provided on the adjustment knob and the grab handle 32, making the annular rib clamped in the annular groove.

According to the adjustable torque clamping fixture with the described structure, when the grab handle 32 is grasped by the hand for rotation, the grab handle 32 drives the first end face teeth 33 to rotate, the first end face teeth 33 transmit a torsion to the second end face teeth 34, and the second end face teeth 34 transmit a torsion to the threaded rod 01, so as to cause the threaded rod 01 to realize axial movement of the threaded rod by means of screw thread transmission, and to drive the first clamping body 02 to clamp an object. When the torsion is large enough, the torsion causes the bevel-shaped teeth of the first end face teeth 33 to axially push away the bevel-shaped teeth of the second end face teeth 34, forcing the second end face teeth to axially move, the first end face teeth are axially separated from the second end face teeth to achieve slippage, so that no larger clamping force can be applied, thus implementing precision clamping, and preventing the clamped object from being damaged by an excessive torque. The maximum clamping force depends on the spring force of the spring, and the spring force of the spring can be adjusted by the adjustment knob.

In order to be compact in structure and facilitate assembly, the adjustment mechanism 36 includes a threaded sleeve 362 and a threaded nut 363. The threaded sleeve 362 is rotatably sleeved at the rear end of the threaded rod 01 and is driven by the adjustment knob to rotate. As shown in FIG. 1, the rear end of the threaded sleeve 362 has a plane 367, and the plane is cooperated with the adjustment knob to enable the adjustment knob to drive the threaded sleeve to rotate. The threaded nut 363 is sleeved on the threaded sleeve 362 by screw thread transmission and cooperated with the grab handle 32 in a manner of an axial movement. As shown in FIG. 1, the threaded nut 363 is hexagonal, and the outer contour of the threaded nut 363 is cooperated with the grab handle, so as to cooperate with the grab handle in a manner of an axial movement. The axial support spring 35 is a helical compression spring sleeved on a threaded rod and has two ends respectively supported on the second end face teeth 34 and the threaded nut 363.

A washer 364 is connected to the rear end of the threaded rod 01 by a screw 366, and the washer 364 limits the threaded sleeve 362 to the rear end of the threaded rod. A first shaft retainer ring 38 for limiting the axial movement of the threaded rod relative to the grab handle 32 is sleeved on the threaded rod 01. A second shaft retainer ring 39 for limiting the axial movement of the first end face teeth 33 relative to the grab handle is sleeved on the threaded rod 01.

A window 37 corresponding to the threaded nut is provided on the grab handle 32, a clamping force scale (not shown in the figure) is provided on the grab handle, a reading index 365 is provided on the threaded nut 363, when the spring force is adjusted, the threaded nut moves axially, and the reading index and the clamping force scale change positions relatively. Therefore, in specific implementation, the reading index and the clamping force scale are interchanged in position. In addition, a reading index and a clamping force scale are respectively provided on the adjustment knob and the grab handle.

The clamp is one of an F-clamp, a G-clamp, an angle clamp, a flat mouth clamp, a cloth strip clamp, a pipe clamp, and a wood clamp. It is only necessary to apply the adjustable torsion handle (see FIG. 5) to the threaded rod.

An F-clamp is as shown in FIGS. 1-4, the F-clamp further includes a guide rod 41, a first arm 42, a second arm 43 and a second clamping body 44, the second arm 43 is fixed at one end of the guide rod 41. The first arm 42 is sleeved on the guide rod 41 and is locked on the guide rod 41 by means of a positioning and locking structure 45. A threaded rod 01 is cooperated with the first arm 42 by means of screw thread to achieve screw thread transmission. The second clamping body 44 is provided on the second arm 43. Unlocking can be achieved by operating the positioning and locking structure, so that the first arm can slide on the guide rod, and an object is quickly clamped by the first clamping body and the second clamping body. When the positioning and locking structure is released, the positioning and locking structure locks the first arm on the guide rod, and then the grab handle is rotated to drive the threaded rod moves axial movement, so as to clamp an object. When the object needs to be released, the grab handle is rotated reversely to enable the object to be loosen, and then the positioning and locking structure can be operated to unlock, so as to enable the first arm to slide on the guide rod.

Figure 6:
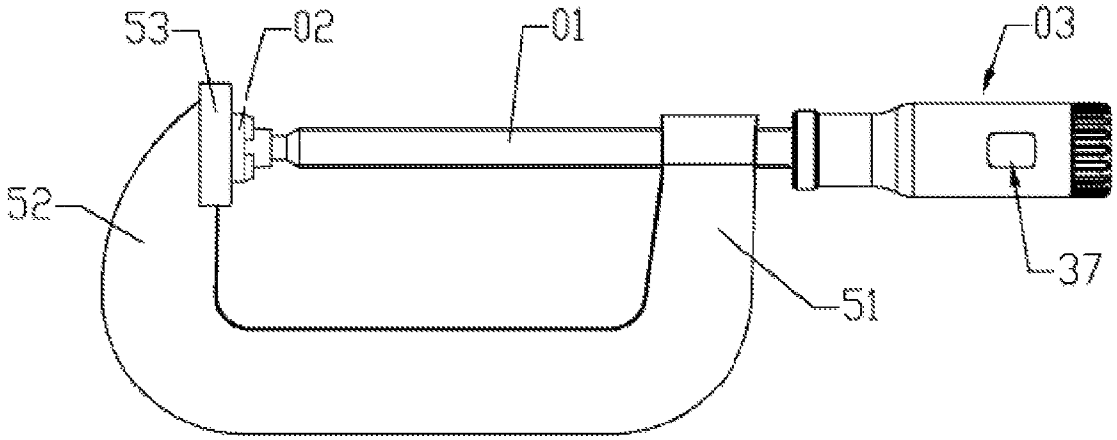
FIG. 6 illustrates a schematic diagram of a second adjustable torque clamping fixture according to some embodiments of the present disclosure.

FIG. 6 shows a G-clamp. The G-clamp has a G-frame including a first arm 51 and a second arm 52. The threaded rod 01 is cooperated with the first arm 51 by screw thread to realize screw thread transmission. The second arm is provided with a second clamping body 53. In the adjustable torque clamping fixture, the grab handle is rotated to drive the threaded rod to move axially, so that an object is clamped by the first clamping body and the second clamping body.

Figure 7:
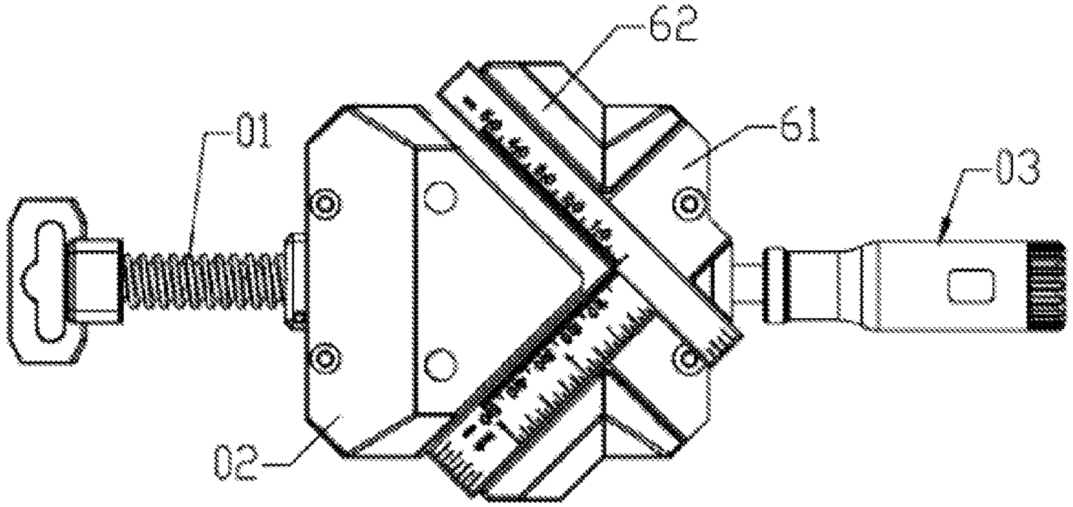
FIG. 7 illustrates a schematic diagram of a third adjustable torque clamping fixture according to some embodiments of the present disclosure.

FIG. 7 shows an angle clamp. The angle clamp has a base 61, the second clamping body 62 forming an included angle is provided on the base 61, the threaded rod 01 is cooperated with the seat 61 by screw thread to realize screw thread transmission, and the shape of the first clamping body 02 is matched with the shape of the second clamping body 62 to clamp an object according to an angle determined by the first clamping body and the second clamping body.

Figure 8:
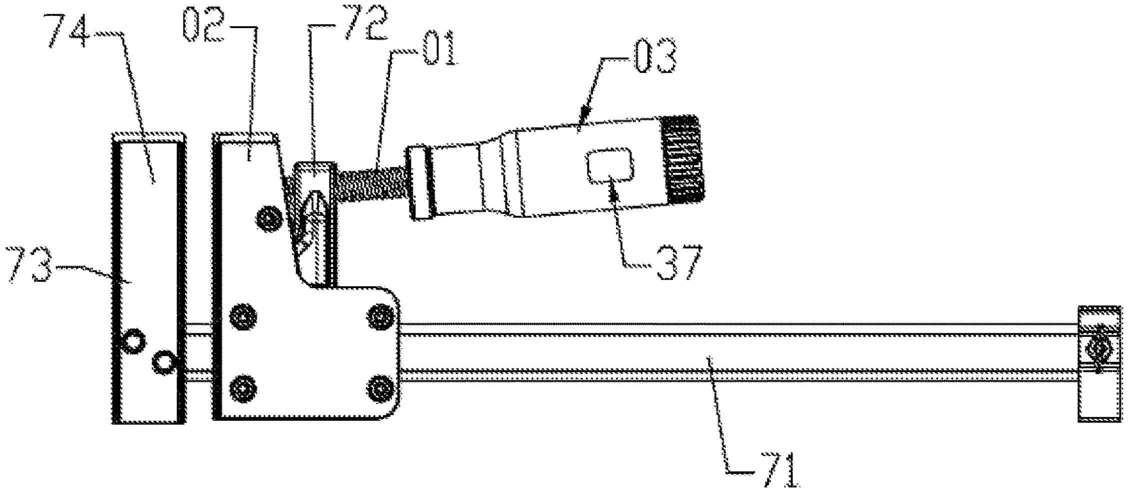
FIG. 8 illustrates a schematic diagram of a fourth adjustable torque clamp according to some embodiments of the present disclosure.

FIG. 8 shows a flat mouth clamp, the flat mouth clamp includes a guide rod 71, a first arm 72, a second arm 73 and a second clamping body 74, the second arm 73 is fixed at one end of the guide rod 71. The first arm 72 is sleeved on the guide rod 71 and is locked on the guide rod 71 by a positioning and locking structure 75. A threaded rod 01 is cooperated with the first arm by means of screw thread to achieve screw thread transmission. The second clamping body 74 is provided on the second arm 73. The first clamping body 02 is provided at the front end of the threaded rod and is also sleeved on the guide rod. The second clamping body and the first clamping body form a flat mouth for placing an object. The flat mouth clamp is operated in the same manner as the F-clamp shown in FIGS. 1-4, except that the guide rod has a guiding function on the first clamping body for holding the flat mouth.

Figure 9:
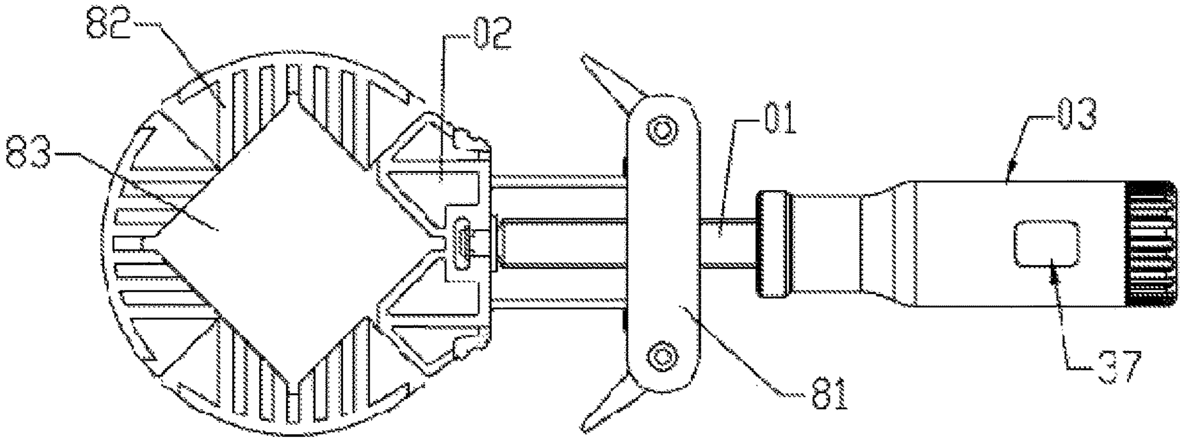
FIG. 9 illustrates a schematic diagram of a fifth adjustable torque clamping fixture according to some embodiments of the present disclosure.

FIG. 9 shows a cloth strip clamp, the cloth strip clamp is used for clamping an object such as cloth and a strip, and has a support 81; a second clamping body 82 is connected to the support 81; the second clamping body forms a groove 83; the threaded rod is cooperated with the support by screw thread, so as to realize screw thread transmission; a first clamping body 02 corresponds to the groove 83; and during clamping, the first clamping body presses the object such as cloth and a strip into the groove to realize clamping.

Figure 10:
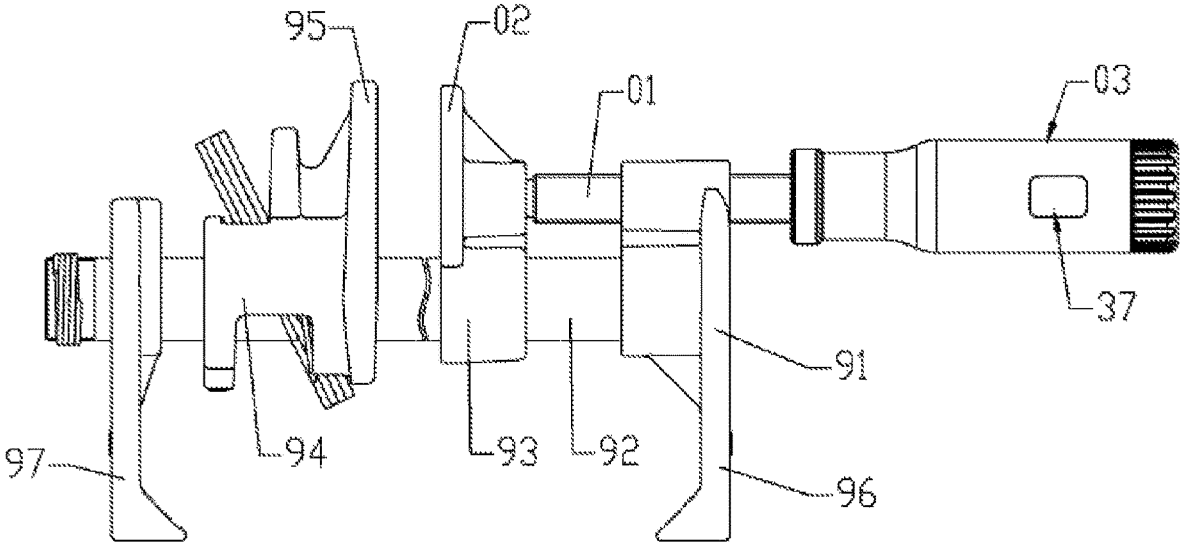
FIG. 10 illustrates a schematic diagram of a sixth adjustable torque clamping fixture according to some embodiments of the present disclosure.

FIG. 10 shows a pipe clamp, the pipe clamp includes a support 91, a guide rod 92, a first arm 93, a second arm 94 and a second clamping body 95, one end of the guide rod is fixed on the support, and the first arm is sleeved on the guide rod, the second arm is sleeved on the guide rod and is locked on the guide rod by the positioning and locking structure, the second clamping body is provided on the second arm, and the first clamping body is provided on the first arm while being provided at the front end of the threaded rod. In addition, a first auxiliary clamping body 96 extends out of the support, and the guide rod is further provided with a second auxiliary clamping body 97. Unlocking can be achieved by operating the positioning and locking structure, so that the second arm can slide on the guide rod, and then the grab handle is rotated to drive the axial movement of the threaded rod, so as to clamp an object.

Figure 11:
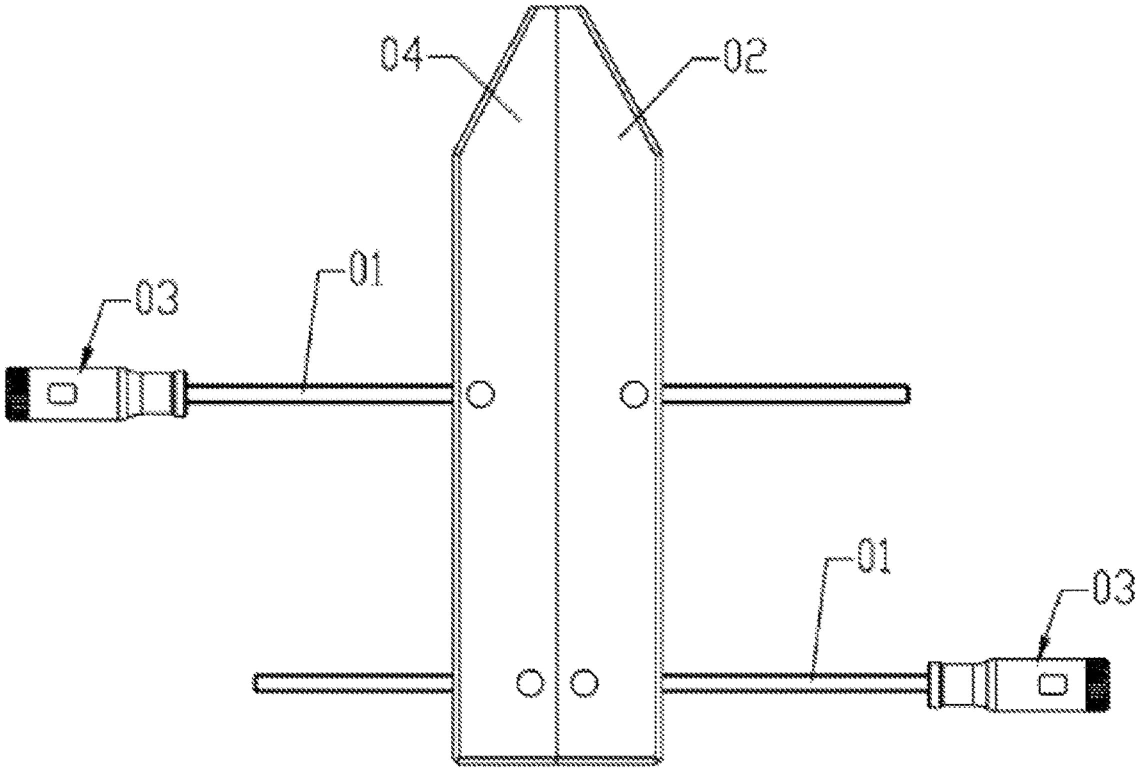
FIG. 11 illustrates a schematic diagram of a seventh adjustable torque clamping fixture according to some embodiments of the present disclosure.

FIG. 11 shows a wood clamp, the wood clamp comprises a first clamping body 02 and a second clamp body 10 which are symmetrical and two threaded rods 01, one threaded rod achieves screw thread transmission with the first clamping body 02 by screw thread, so as to drive the second clamping body 10 to move, the other one of the threaded rods achieves screw thread transmission with the second clamping body 10 by screw thread, so as to drive the first clamping body 02 to move, the two threaded rods are parallel, and the clamping force of the first clamping body and the clamping force of the second clamping body can be adjusted by rotating the two grab handles respectively.

What is claimed is:

1. An adjustable torque clamping fixture, comprising a first clamping body driven by a threaded rod and used for clamping an object, an axial movement of the threaded rod being realized by screw thread transmission, wherein a rear end of the threaded rod is provided with an adjustable torque handle, the adjustable torque handle comprises a grab handle with an inner cavity, a first end face teeth, a second end face teeth, an axial support spring and an adjustment mechanism, the first end face teeth are located in the inner cavity, are rotatably sleeved on the threaded rod and fixedly cooperated with the grab handle to transmit a torsion, the second end surface teeth are located in the inner cavity, and slipably engaged with the first end surface teeth, the second end face teeth are axially moved and are sleeved on the threaded rod by transmitting a torsion, the axial support spring is provided between the second end face teeth and the adjustment mechanism and is configured to apply a spring force to the second end face teeth, the spring force causes the second end face teeth to contact the first end face teeth, the adjustment mechanism comprises an adjustment knob, the adjustment knob is rotatably cooperated with the grab handle, and a rotation of the adjustment knob is used for adjusting a spring force of the axial support spring.

2. The adjustable torque clamping fixture according to claim 1, wherein the adjustment mechanism comprises a threaded sleeve and a threaded nut, the threaded sleeve is rotatably sleeved at the rear end of the threaded rod and is driven by the adjustment knob to rotate, the threaded nut is sleeved on the threaded sleeve and screw thread cooperated with the threaded sleeve, and the threaded nut is cooperated with the grab handle for an axial movement, the axial support spring is a helical compression spring sleeved on the threaded rod, and two ends of the helical compression spring are respectively supported on the second end face teeth and the threaded nut.

3. The adjustable torque clamping fixture according to claim 2, wherein the adjustment mechanism comprises a washer connected to the rear end of the threaded rod, and the washer limits the threaded sleeve to the rear end of the threaded rod.

4. The adjustable torque clamping fixture according to claim 2, wherein a window corresponding to the threaded nut is provided on the grab handle, and a reading index is provided on the threaded nut, and a clamping force scale is provided on the grab handle.

5. The adjustable torque clamping fixture according to claim 1, wherein a reading index and a clamping force scale are respectively provided on the adjustment knob and the grip.

6. The adjustable torque clamping fixture according to claim 1, wherein the adjustable torque handle comprises a first shaft retainer ring for limiting an axial movement of the threaded rod relative to the grab handle, wherein the first shaft retainer ring is sleeved on the threaded rod.

7. The adjustable torque clamping fixture according to claim 1, wherein the adjustable torque handle comprises a second shaft retainer ring for limiting an axial movement of the first end surface teeth relative to the grab handle, wherein the second shaft retainer ring is sleeved on the threaded rod.

8. The adjustable torque clamping fixture according to claim 1, wherein the first end face teeth are rotatably sleeved on the threaded rod by a cylindrical surface, and the first end face teeth are cooperated with the grab handle by a plane, so as to realize a fixed cooperating of the first end face teeth with the grab handle, the plane is an outer circumferential of the first end face teeth.

9. The adjustable torque clamping fixture according to claim 1, wherein the second end face teeth are sleeved on the threaded rod, and achieve an axial movement with the threaded rod and transmit a torsion by a plane cooperation, the plan is an inner periphery of the second end face teeth.

10. The adjustable torque clamping fixture according to claim 1, wherein the adjustable torque clamping fixture is one of an F-clamp, a G-clamp, an angle clamp, a flat mouth clamp, a cloth strip clamp, a pipe clamp, and a wood clamp.

* * * * *